(12) United States Patent
Ebitani

(10) Patent No.: US 7,965,400 B2
(45) Date of Patent: Jun. 21, 2011

(54) IMAGE PROCESSING APPARATUS, IMAGE PROCESSING SYSTEM, COMPUTER READABLE MEDIUM, AND IMAGE PROCESSING METHOD

(75) Inventor: Kenji Ebitani, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1077 days.

(21) Appl. No.: 11/503,915

(22) Filed: Aug. 15, 2006

(65) Prior Publication Data

US 2007/0115495 A1 May 24, 2007

(30) Foreign Application Priority Data

Nov. 24, 2005 (JP) .................................. 2005-338196

(51) Int. Cl.
*G06K 15/00* (2006.01)
*H04N 1/40* (2006.01)
*H04N 1/00* (2006.01)

(52) U.S. Cl. ...... 358/1.14; 358/1.16; 358/403; 358/444; 358/448

(58) Field of Classification Search .................. 358/1.16, 358/403, 444, 1.14, 448, 518, 519, 1.9, 1.15, 358/1.13, 1.8, 1.12, 1.2
See application file for complete search history.

(56) References Cited

U.S. PATENT DOCUMENTS

| | | | |
|---|---|---|---|
| 5,717,841 A * | 2/1998 | Farrell et al. | 358/1.15 |
| 5,768,483 A * | 6/1998 | Maniwa et al. | 358/1.15 |
| 6,157,465 A * | 12/2000 | Suda et al. | 358/407 |
| 6,213,652 B1 * | 4/2001 | Suzuki et al. | 358/1.15 |
| 6,477,580 B1 * | 11/2002 | Bowman-Amuah | 709/231 |
| 6,539,396 B1 * | 3/2003 | Bowman-Amuah | 707/103 R |
| 6,578,068 B1 * | 6/2003 | Bowman-Amuah | 709/203 |
| 6,606,163 B1 * | 8/2003 | Suzuki et al. | 358/1.15 |

(Continued)

FOREIGN PATENT DOCUMENTS

EP 0 980 178 A2 2/2000

(Continued)

OTHER PUBLICATIONS

Office Action issued in JP Application No. 2005-338196 on Dec. 17, 2010 (with English translation).

*Primary Examiner* — Twyler L Haskins
*Assistant Examiner* — Jonathan R Beckley
(74) *Attorney, Agent, or Firm* — Oliff & Berridge, PLC

(57) ABSTRACT

An image processing apparatus includes a job execution unit, a log generation unit, a log storage unit, a feature amount extraction unit and a replacement unit. The job execution unit executes a processing job of image data. Te log generation unit generates image log information for identifying the executed processing job and identifying the processed image data. The log storage unit stores the generated image log information. The feature amount extraction unit extracts a feature amount of the image data identified by the image log information. The identity determination unit compares feature amounts extracted from pieces of the image data identified by pieces of the image log information, to determine identity among the image data. The replacement unit replaces information to identify a piece of the image data, which are determined to be identical, with information to identify another piece of the image data.

13 Claims, 8 Drawing Sheets

U.S. PATENT DOCUMENTS

| | | | |
|---|---|---|---|
| 6,615,253 B1 * | 9/2003 | Bowman-Amuah | 709/219 |
| 7,012,715 B2 * | 3/2006 | Yamaguchi | 358/1.9 |
| 7,031,554 B2 * | 4/2006 | Iwane | 382/305 |
| 7,110,917 B2 * | 9/2006 | Matsuura et al. | 702/185 |
| 7,170,620 B2 * | 1/2007 | Gassho et al. | 358/1.15 |
| 7,612,921 B2 * | 11/2009 | Okabe et al. | 358/403 |
| 2003/0007178 A1 * | 1/2003 | Jeyachandran et al. | 358/1.15 |
| 2005/0111051 A1 * | 5/2005 | Uchikawa | 358/448 |
| 2006/0176509 A1 * | 8/2006 | Aoki et al. | 358/1.15 |
| 2006/0238824 A1 * | 10/2006 | Otake et al. | 358/448 |
| 2009/0002744 A1 * | 1/2009 | Shimada | 358/1.15 |

FOREIGN PATENT DOCUMENTS

| | | |
|---|---|---|
| JP | A 06-270477 | 9/1994 |
| JP | 08-315119 A | 11/1996 |
| JP | 11-007521 A | 1/1999 |
| JP | 2000-057159 A | 2/2000 |
| JP | 2001-319231 A | 11/2001 |
| JP | 2002-024060 A | 1/2002 |
| JP | A-2002-010001 | 1/2002 |
| JP | 2005-020409 A | 1/2005 |
| JP | A 2005-157569 | 6/2005 |

* cited by examiner

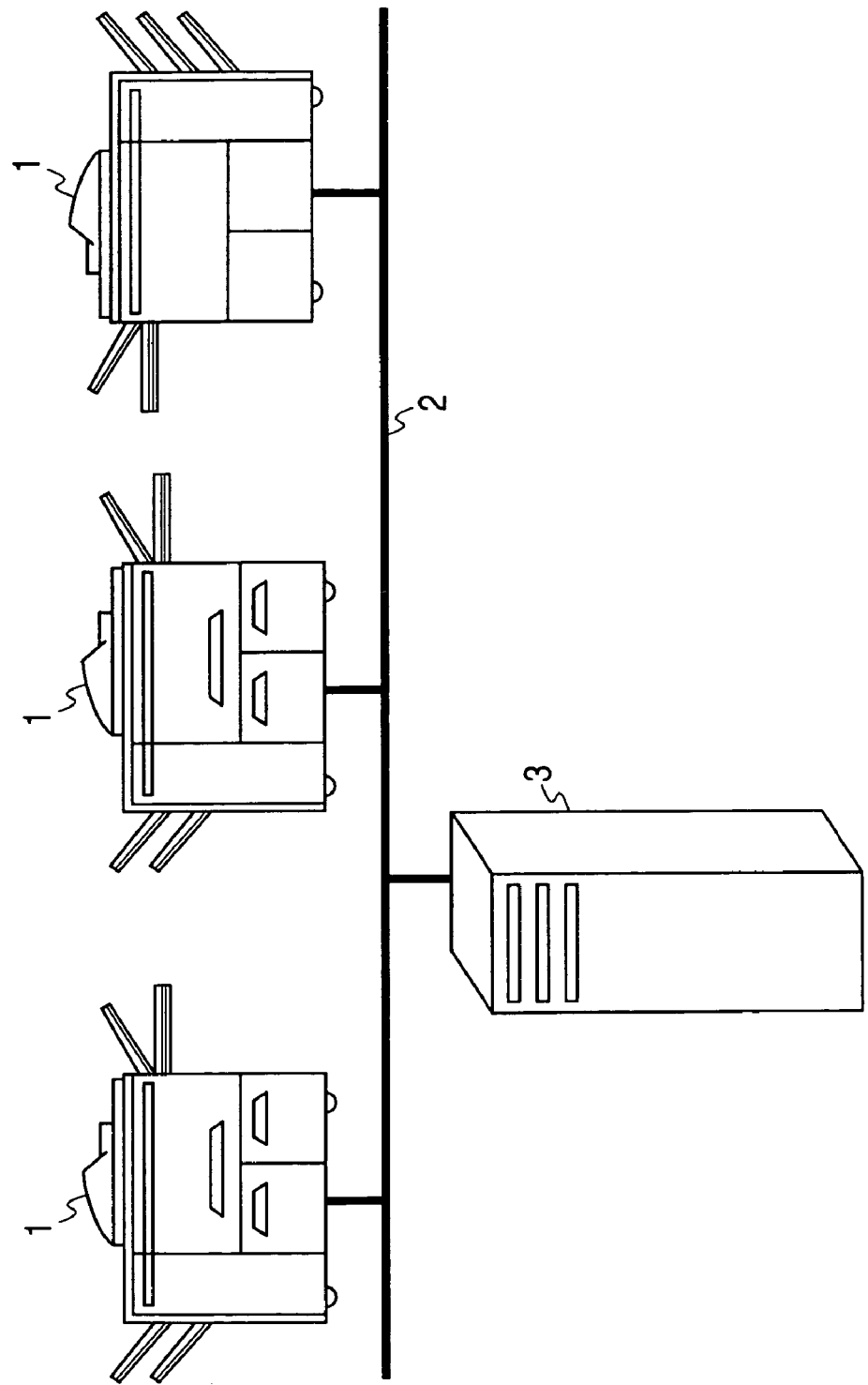

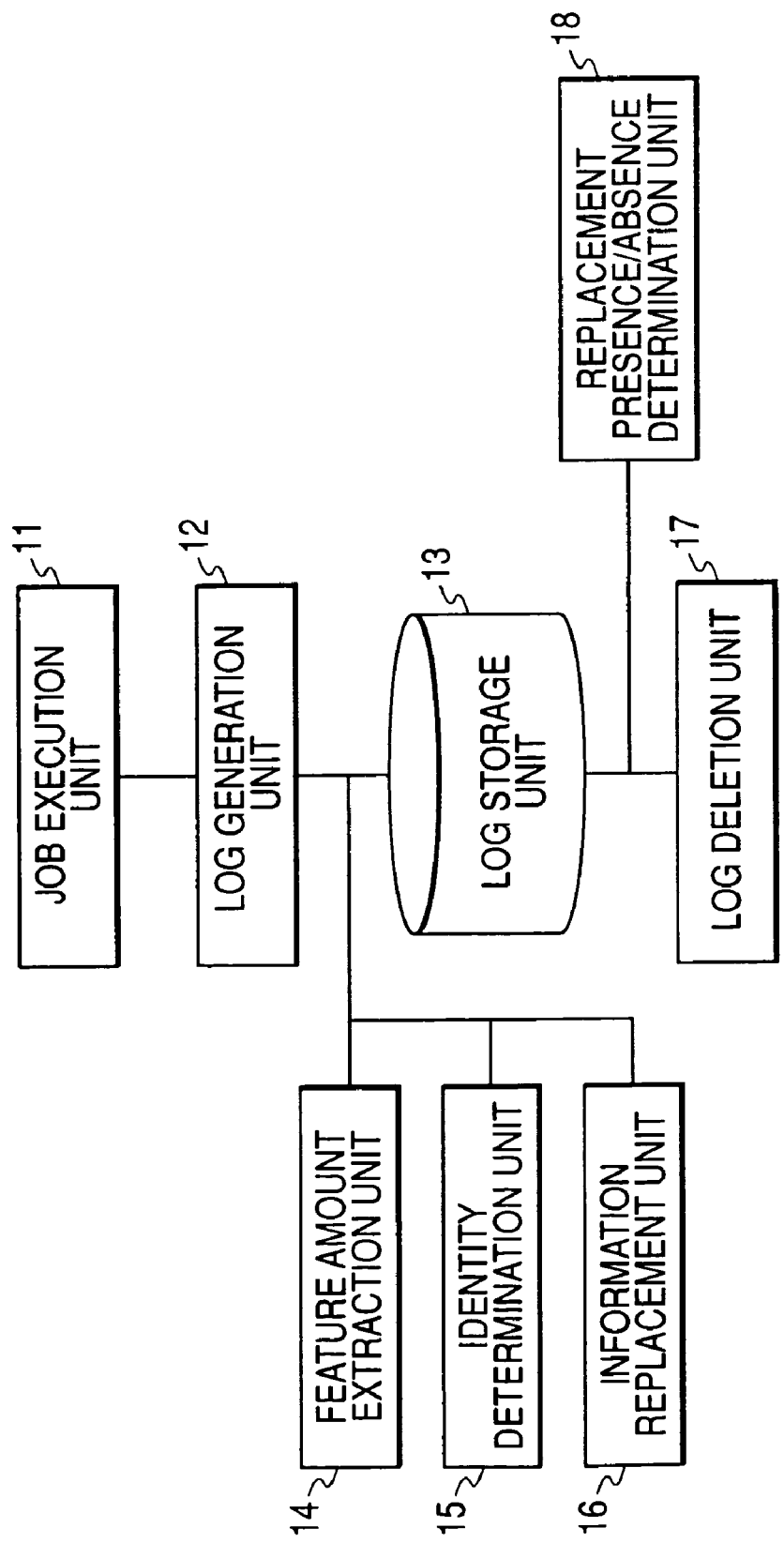

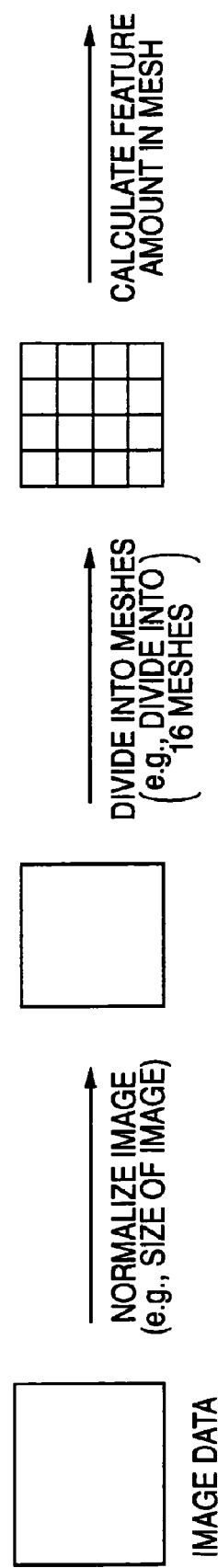

FIG. 4A

| USER NAME | DATE AND TIME | IMAGE DATA IDENTIFICATION INFORMATION (STORAGE LOCATION OF IMAGE, FILE NAME AND URL) |
|---|---|---|
| AAAA | mm/mm/mm | IMAGE (1) |
| BBBB | nn/nn/nn | IMAGE (2) |
| CCCC | ll/ll/ll | IMAGE (3) |
| DDDD | kk/kk/kk | IMAGE (4) |

FIG. 4B

| USER NAME | DATE AND TIME | IMAGE DATA IDENTIFICATION INFORMATION (STORAGE LOCATION OF IMAGE, FILE NAME AND URL) |
|---|---|---|
| AAAA | mm/mm/mm | IMAGE (1) |
| BBBB | nn/nn/nn | IMAGE (2) |
| CCCC | ll/ll/ll | IMAGE (1) |
| DDDD | kk/kk/kk | IMAGE (2) |

FIG. 5A

| USER NAME | DATE AND TIME | IMAGE DATA IDENTIFICATION INFORMATION | DOCUMENT ID |
|---|---|---|---|
| AAAA | mm/mm/mm | IMAGE (1) | — |
| BBBB | nn/nn/nn | IMAGE (2) | 001 |
| CCCC | ll/ll/ll | IMAGE (3) | — |
| DDDD | kk/kk/kk | IMAGE (4) | 002 |
| EEEE | oo/oo/oo | IMAGE (5) | 001 |
| FFFF | pp/pp/pp | IMAGE (6) | — |

FIG. 5B

| USER NAME | DATE AND TIME | IMAGE DATA IDENTIFICATION INFORMATION | DOCUMENT ID |
|---|---|---|---|
| AAAA | mm/mm/mm | IMAGE (1) | — |
| BBBB | nn/nn/nn | IMAGE (2) | 001 |
| CCCC | ll/ll/ll | — | 001 |
| DDDD | kk/kk/kk | IMAGE (4) | 002 |
| EEEE | oo/oo/oo | — | 001 |
| FFFF | pp/pp/pp | IMAGE (1) | — |

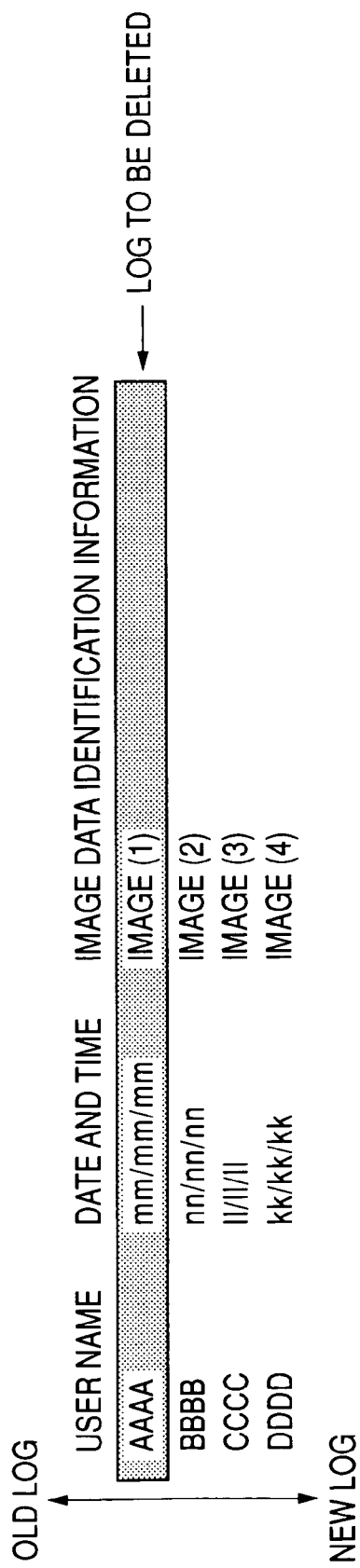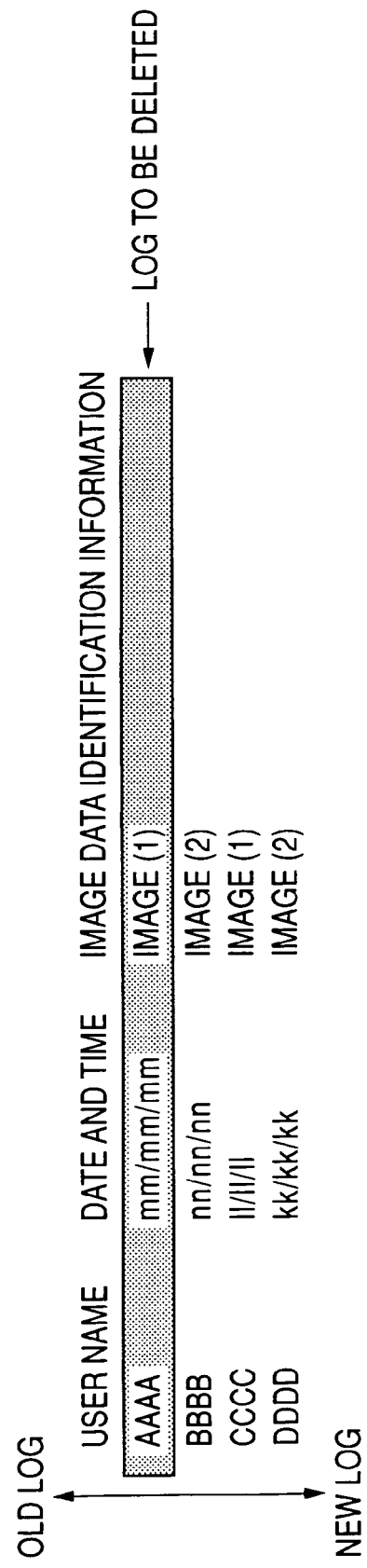

FIG. 7

| CONDITION HIT IMAGE | USER NAME | NUMBER OF OUTPUT TIMES | OUTPUT DATE AND TIME |
|---|---|---|---|
| IMAGE (5) | AAAA | 30 | mm/mm/mm, m1/m1/m1, ...... ll/ll/ll |
| | CCCC | 1 | ..... |
| ..... | | | |
| IMAGE (8) | AAAA | 30 | nn/nn/nn, n1/n1/n1, ...... |
| | DDDD | 1 | kk/kk/kk |

FEATURE AMOUNT SPACE
FOR IMAGE SEARCH

SEARCH RESULTS: TOP THREE
     (1) DOCUMENT A
     (2) DOCUMENT A
     (3) DOCUMENT A

- ◉ : FEATURE AMOUNT OF DOCUMENT A
- ◎ : FEATURE AMOUNT OF DOCUMENT B
- ⊛ : FEATURE AMOUNT OF DOCUMENT C
- ⦸ : FEATURE AMOUNT OF SEARCH TARGET DOCUMENT

FEATURE AMOUNT SPACE
FOR IMAGE SEARCH

SEARCH RESULTS: TOP THREE
     (1) DOCUMENT A
     (2) DOCUMENT C
     (3) DOCUMENT B

IMAGE PROCESSING APPARATUS, IMAGE PROCESSING SYSTEM, COMPUTER READABLE MEDIUM, AND IMAGE PROCESSING METHOD

BACKGROUND

1. Technical Field

This invention relates to an image processing apparatus, an image processing system, a computer readable medium, and an image processing method for executing a processing job of image data.

2. Related Art

In recent years, a multiple function processing machine into which a scan function, a copy function, a print function, a FAX function, and the like, for example, are integrated has been widely known as an image processing apparatus for executing a processing job of image data. Such an image processing apparatus can execute processing jobs such as reading of image data, print output, and FAX transmission. As it becomes widespread, the risk of information leakage such as output of a copy-inhibited document is also increased and thus there is a demand for making it possible to conduct a follow-up survey on the information output history when information is leaked. Thus, some image processing apparatus are configured so as to store a processing job execution history as log information to make it possible to check by whom, when, and where the information-leaked document was output. (For example, refer to JP Hei.6-270477 A and US 2005/0111051 A) JP Hei.6-270477 has proposed storing image information corresponding to an image per se as log information. Also, US 2005/0111051 A has proposed extracting and storing text data contained in an image as log information.

By the way, generally the log information is information to record a processing job execution history and thus needs to be generated and stored each time a processing job is executed, namely, for each processing job.

On the other hand, log information is generated under the same condition (retained image resolution, information amount for search, etc.,) for the documents processed in any processing jobs.

Therefore, for example, to use an image processing apparatus in an environment to process a large amount of job (document output, etc.,), for example, the data amount of the log information to be stored becomes enormous, a large storage capacity becomes necessary for storing the log information, and it also takes much time in surveying the job execution history based on the storage contents. Since the log information is generated under the same condition, for example, even if there are a plurality of jobs to process the same document, separate log information is generated and stored for each processing job if the requester, the processing execution time, etc., of the job differs.

Further, if the data amount of the log information becomes enormous, a large number of search targets exist in a follow-up survey on the job execution history executed when information is leaked, and thus it is feared that the search accuracy, namely, the reliability for the result of the follow-up survey may be impaired.

SUMMARY

According to one aspect of the invention, an image processing apparatus includes a job execution unit, a log generation unit, a log storage unit, a feature amount extraction unit and a replacement unit. The job execution unit executes a processing job of image data. Te log generation unit generates image log information for identifying the processing job executed by the job execution unit and identifying the image data processed in the processing job. The log storage unit stores the image log information generated by the log generation unit. The feature amount extraction unit extracts a feature amount of the image data identified by the image log information. The identity determination unit compares feature amounts, which are extracted by the feature amount extraction unit from plural pieces of the image data identified by plural pieces of the image log information, to determine identity among the plural pieces of image data. The replacement unit replaces information to identify a piece of the plural pieces of image data which are determined to be identical with each other, with information to identify another piece of the plural pieces of image data which are determined to be identical with each other.

BRIEF DESCRIPTION OF THE DRAWINGS

Exemplary embodiments of the invention will be described in detail based on the following figures, wherein:

FIG. 1 is a schematic drawing to show an outline configuration example of an image processing system according to the invention;

FIG. 2 is a block diagram to show a functional configuration example of the image processing system or an image processing apparatus according to the invention;

FIG. 3 is a schematic representation to show an example of the feature amount of image data;

FIG. 4 is a schematic representation to show a specific example of image log information;

FIG. 5 is a schematic representation to show another specific example of image log information;

FIG. 6 is a schematic representation to show a specific example of deletion processing of image log information;

FIG. 7 is a schematic representation to show an outline of an example of the use mode of the image log information.

DETAILED DESCRIPTION

Figure 8A:
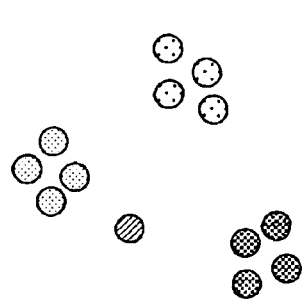
FIG. 8 is a schematic representation to show an outline of another example of the use mode of the image log information.

An image processing apparatus, an image processing system, an image processing program, and an image processing method according to exemplary embodiments of the invention will be discussed below with reference to the accompanying drawings:

To begin with, the outline configuration of an image processing system will be discussed. FIG. 1 is a schematic drawing to show an outline configuration example of the image processing system according to an exemplary embodiment of the invention.

As illustrated in the figure, the image processing system described here includes a plurality of image processing apparatuses 1. Each image processing apparatus 1 is a multiple function processing machine into which a scan function, a copy function, a print function, a FAX function, and the like, for example, are integrated, and is provided with a function as job execution unit for executing processing jobs of image data such as an image reading job, a print output job, and a FAX transmission job. The term "image data" mentioned here is used to mean data for identifying an image to be processed in a processing job. Data format of the image data is not limited.

Therefore, if data identifies a document image made up of text only, the data after being rasterized, for example, falls in the "image data".

A server 3 is connected to the image processing apparatuses 1 through a network line 2. The server 3 provides service of storing image log information, for each image processing apparatus 1.

The image log information will be discussed briefly. The image log information corresponds to log information of the processing job executed in the image processing apparatus 1. The image log information identifies the processing job and identifies image data processed in the processing job.

Information for "identifying a processing job" includes, for example, information concerning job attributes (hereinafter referred to as "job attribute information") such as a requester (user) of the processing job, processing execution time of the processing job. The job attribute information may be acquired using a known technique of UI setting recognition, card authentication, etc., at the time of executing a processing job.

Information for "identifying image data" may be the image data itself, for example. In this case, the image data may be image data processed in the processing job or may be image data after subjected to data reduction processing such as data compression. However, it is also possible to "identify image data" using information concerning the storage location of the image data (storage location name, file name, URL information, etc.,) rather than the image data itself.

If code information to identify an original image (document ID) is embedded in the original image to be processed in a processing job using a bar code, a QR code (two-dimensional code), an electronic watermark (digital watermarking) or the like, the code information may be contained in the image log information. That is, the code information may be used as one of the information for "identifying image data."

It is assumed that such image log information is generated for each image processed in the processing job, namely, for each page of image data. After the image log information is generated, the image log information is stored and is provided for surveying the execution history of the processing job.

The data format, etc., of the image log information is not limited and the image log information can be provided using a known technique.

Subsequently, a configuration of the image processing system will be discussed. The configuration described below may be implemented as only one image processing apparatus 1 or may be implemented as the image processing apparatus 1 and the server 3.

FIG. 2 is a block diagram to show a configuration example of this exemplary embodiment. As illustrated in the figure, the configuration includes a job execution unit 11, a log generation unit 12, a log storage unit 13, a feature amount extraction unit 14, an identity determination unit 15, an information replacement unit 16, a log deletion unit 17, and a replacement presence/absence determination unit 18.

The job execution unit 11 is provided in the image processing apparatus 1 and executes image data processing jobs such as an image reading job, a print output job and a FAX transmission job.

The log generation unit 12 is provided in at least either the image processing apparatus 1 or the server 3, and generates image log information of a processing job when the processing job is executed by the job execution unit 11.

The log storage unit 13 is provided in at least either the image processing apparatus 1 or the server 3, and stores the image log information generated by the log generation unit 12.

The feature amount extraction unit 14 is provided in at least either the image processing apparatus 1 or the server 3, and extracts a feature amount of the image data, which is identified by the image log information generated by the log generation unit 12 or the image log information stored in the log storage unit 13. The "feature amount of image data" represents a feature of an image quantitatively. For example, the "feature amount of image data" may be a histogram of density distribution in an image, a histogram of an edge existence amount, a histogram of distribution of the edge existence amount, a histogram of a color value distribution or representation of a pixel distribution in the image by the run length. Feature amounts of different types may be used in combination.

FIG. 3 is a schematic representation to show an example of the feature amount of the image data. As an example of the feature amount of the image data, a size of the image data may be normalized, the image data may be divided into meshes (for example, 16 meshes), and the feature amount in each mesh may be calculated. In this case, if an average density is used as a feature amount in each mesh, the feature amount of 16-dimensional density distribution is obtained. If number of edge points is used as the feature amount in each mesh, the feature amount of 16-dimensional light and shade change is obtained. In the 16-dimensional space, for example, a distance between feature amounts of the image data may be used as a coincidence degree (similarity) between the image data. If a distance between feature amounts of image data is less than a predetermined threshold value, the image data may be regarded as being in a range of identity.

The feature amount of the image data is not limited to the examples mentioned here. The feature amount provided based on any other known technique may be used.

The identity determination unit 15 is provided in at least either the image processing apparatus 1 or the server 3. The identity determination unit 15 makes a comparison among feature amounts, which are extracted by the feature amount extraction unit 14 from plural pieces of image data identified by plural pieces of image log information generated by the log generation unit 12 or stored in the log storage unit 13, to determine identity among the image data. To determine the identity, the identity determination unit 15 may make a comparison among the feature amounts to calculate coincidence degree and determine as to whether or not the coincidence degree is higher than a preset threshold value. That is, if the coincidence degree is higher than the threshold value, the identify determination unit 15 determines that the plural pieces of the image data are in the range of the identity. According to this configuration, the identity determination unit 15 determines that not only plural pieces of image data, whose feature amounts completely coincide with each other, but also plural pieces of image data whose feature amounts are very close to each other are in the range of the identity. Therefore, it is possible to prevent conditions at the time of acquiring the image data (for example, dust or dirt at the time of reading the image read) from affecting on the determination result of the identity. Calculation of the coincidence degree performed by the identity determination unit 15 may be performed using a known technique. Therefore, the calculation of the coincidence degree will not be discussed here in detail.

If the image log information contains code information, the identity determination unit 15 may determine the identity from the comparison result among the plural pieces of code information pieces. That is, the identity determination unit 15 may make identity determination among plural pieces of image log information, based on at least one of the plural pieces of code information contained in the image log information and the feature amounts extracted by the feature amount extraction unit 14.

The information replacement unit 16 is provided in at least either the image processing apparatus 1 or the server 3. The information replacement unit 16 performs replacement processing of unifying plural pieces of information, which identify plural pieces of image data and are contained in plural pieces of image log information, which are determined to be in a range of identity by the identity determination unit, into any one of the plural pieces of information contained in the plural pieces of the log image information, which are in the range of identity. A specific example of the replacement processing performed by the information replacement unit 16 will be described later.

The log deletion unit 17 is provided in at least either the image processing apparatus 1 or the server 3. The log deletion unit 17 deletes the image log information stored in the log storage unit 13 from the log storage unit 13 under a predetermined condition to effectively use the storage area. Examples of the predetermined condition include the case where a predetermined time period has elapsed since the image log information is stored in the log storage unit 13.

However, the log deletion unit 17 does not uniformly delete the image log information meeting the predetermined condition and can exclude the post-unified image log information subjected to the replacement processing of the information replacement unit 16 from target of the deletion.

The replacement presence/absence determination unit 18 is provided in at least either the image processing apparatus 1 or the server 3. The replacement presence/absence determination unit 18 determines whether or not information, which identifies image data and is contained in the image log information to be deleted by the log deletion unit 17, is unified information, which has been subjected to the replacement processing of the information replacement unit 16, and sending the determination result to the log deletion unit 17. To determine whether or not the information is unified information, which has been subjected to the replacement processing, the replacement presence/absence determination unit 18 may checks if any other image log information stored in the log storage unit 13 contains the same information as unified information subjected to the replacement processing, namely, the information for identifying image data in the image log information to be deleted.

Of the units 11 to 18, the units 12 to 18 except the job execution unit 11 may be placed collectively in either the image processing apparatus 1 or the server 3 or may be distributed in the image processing apparatus 1 and the server 3. Further, the image processing apparatus 1 and the server 3 may be provided with the units 12 to 18 duplicately.

To implement the units 12 to 18 except the job execution unit 11, computer functions of the image processing apparatus 1 or the server 3 may execute a predetermined program. In this case, the predetermined program may be stored in a computer-readable storage medium and be provided or may be delivered through wire or wireless communication unit before the program is installed in the image processing apparatus 1 or the server 3. That is, the units 12 to 18 may implemented by an information processing program, which can be installed in the image processing apparatus 1 or the server 3 connected to the image processing apparatus 1. However, the units 12 to 18 may be distributed in the image processing apparatus 1 and the server 3. Thus, the information processing program need not necessarily provide all of the units 12 to 18. For example, the information processing program may be installed in the server 3 for receiving and storing image log information for the purpose of efficiently receiving and storing image log information. Specifically, the information processing program may cause the server 3 to function as the log storage unit 13, the feature amount extraction unit 14, the identity determination unit 15, and the information replacement unit 16.

Next, an example of a processing operation executed by the image processing apparatus 1 and/or the described server 3 (including the case where the functions are provided by the information processing program), namely, an image processing method according to this exemplary embodiment will be discussed.

To begin with, the case where the processing operation of the image processing apparatus 1, which has the units 12 to 18 and is used on a standalone basis, will be described as an example.

For example, if the user enters a processing command of a document copy job in the image processing apparatus 1, the job execution unit 11 reads an image from a document to be processed, acquires image data, and prints out the acquired image data. When the job execution unit 11 executes such an image data processing job, the log generation unit 12 acquires job attribute information such as a user name and a processing execution time of the processing job, and generates image log information from (a) the job attribute information and if the image data processed by the job execution unit 11 or the image data, which has been processed, is stored in a predetermined location, (b) information regarding storage location, that is, information identifying the image data (herein after referred to as "image data identification information"). When the log generation unit 12 generates the image log information, the log storage unit 13 receives and stores the image log information. Therefore, if the job execution unit 11 executes plural processing jobs, plural pieces of image log information are stored in the log storage unit 13.

FIG. 4 is a schematic representation to show a specific example of the image log information.

FIG. 4A shows a state in which image log information (first image log information) of a job concerning image data identification information of image (1), which was processed at date and time mm/mm/mm according to a command of user AAAA; image log information (second image log information) of a job concerning image data identification information of image (2), which was processed at date and time nn/nn/nn according to a command of user BBBB; image log information (third image log information) of a job concerning image data identification information of image (3), which was processed at date and time ll/ll/ll according to a command of user CCCC; and image log information (fourth image log information) of a job concerning image data identification information of image (4), which was processed at date and time kk/kk/kk according to a command of user DDDD are stored. In such a storage mode of the image log information, an amount of information to be stored may become enormous.

Thus, in the image processing apparatus 1, the feature amount extraction unit 14, the identity determination unit 15, and the information replacement unit 16 perform the processing operation described below at a predetermined timing different from the timing when the log generation unit 12 generates the image log information. For example, the predetermined timing may be a timing after transition to a sleep mode in which the processing load on the image processing apparatus 1 is low. For example, the predetermined timing may be a regular timing at which it is considered that the processing load on the apparatus is low, such as 00:00. That is, although the processing operation described below may be performed each time the log generation unit 12 generates image log information, if the processing operation described below is performed at a predetermined timing different from the timing of generating the image log information, the processing load can be prevented from concentrating. Also, the image processing apparatus 1 can be operated efficiently.

When the predetermined timing is reached, the feature amount extraction unit 14 extracts a feature amount of image data identified by the image data identification information contained in the image log information stored in the log storage unit 13. The identity determination unit 15 makes a comparison among the feature amounts extracted by the feature amount extraction unit 14 from the plural pieces of image log information stored in the log storage unit 13 in a storage order with using older information as a reference, for example, to determine the identity among the plural pieces of image log information. Specifically, in the example shown in FIG. 4A, the identity determination unit 15 compares the feature amount about the second image log information with the feature amount about the first image log information. Then, the identity determination unit 15 compares the feature amount about the third image log information with the feature amount about the first image log information and that about the second image log information. Furthermore, the identity determination unit 15 compares the feature amount about the fourth image log information with the feature amount about the first image log information, that about the second image log information, and that about the third image log information. Thereby, the identity determination unit 15 determines the identity among the first to fourth image log information.

Upon reception of the determination result of the identity determination unit 15, the information replacement unit 16 performs replacement processing of the image data identification information contained in the image log information stored in the log storage unit 13, if necessary.

The case where the identity determination unit 15 determines that the feature amount of the image data identified by the image data identification information of image (1) and the feature amount of the image data identified by the image data identification information of image (3) are in the range of the identity and that the feature amount of the image data identified by the image data identification information of image (2) and the feature amount of the image data identified by the image data identification information of image (4) are in the range of the identity will be described as an example. In this case, the information replacement unit 16 performs replacement processing of unifying the image data identification information of image (1) and the image data identification information of image (3) and performs replacement processing of unifying the image data identification information of image (2) and the image data identification information of image (4) as shown in FIG. 4B. Further specifically, the information replacement unit 16 replaces the image data identification information of image (3) with the image data identification information of image (1), and replaces the image data identification information of image (4) with the image data identification information of image (2). At this time, the information replacement unit 16 also deletes the image data identified by the image data identification information of image (3) and the image data identified by the image data identification information of image (4). For example, if the image data identification information of image (3) is image data per se, the information replacement unit 16 replaces this image data with image data identification information for identifying a storage location of the image data of image (1) while deleting the image data identification information of image (3). For example, if the image data identification information of image (3) is information for identifying the storage location of the image data, the information replacement unit 16 issues a request for deleting the image data to the storage location of the image data about image (3) while replacing the image data identification information of image (3) with the image data identification information of image (1).

Next, another specific example of the image log information will be discussed. Here, in the other specific example, image log information contains code information.

FIG. 5 is a schematic representation to show another specific example of the image log information.

FIG. 5A shows a state in which image log information (first image log information) of a job concerning image data identification information of image (1), which was processed at date and time mm/mm/mm according to a command of user AAAA; image log information (second image log information) of a job concerning image data identification information of image (2), which was processed at date and time nn/nn/nn according to a command of user BBBB; image log information (third image log information) of a job concerning image data identification information of image (3), which was processed at date and time ll/ll/ll according to a command of user CCCC; image log information (fourth image log information) of a job concerning image data identification information of image (4), which was processed at date and time kk/kk/kk according to a command of user DDDD; image log information (fifth image log information) of a job concerning image data identification information of image (5), which was processed at date and time oo/oo/oo according to a command of user EEEE; and image log information (sixth image log information) of a job concerning image data identification information of image (6), which was processed at date and time pp/pp/pp according to a command of user FFFF are stored.

Each piece of the image log information contains document ID as code information acquired from an original image processed in the processing job. That is, the second image log information and the fifth image log information contain document ID of 001 and the fourth image log information contains document ID of 002. The first image log information, the third image log information, and the sixth image log information do not contain information about document ID because document ID cannot be extracted or code information does not exist on original images or for any other reason.

When a predetermined timing is reached, the identity determination unit 15 determines identity among the image log information stored in such a mode, and the information replacement unit 16 performs the replacement processing, if necessary. In this case, however, the identity determination unit 15 and the information replacement unit 16 use the document ID preferentially as described below:

For example, the identity determination unit 15 first uses the document ID to determine the identity among the first to sixth image data identification information. In the example shown in FIG. 5A, the identity determination unit 15 determines that the second image log information and the fifth image log information are identical to each other. After the determination using the document ID, the identity determination unit 15 determines the identity among the other image data identification information, based on the feature amounts extracted by the feature amount extraction unit 14 from the other image log information whose identity cannot be determined based on the document ID. If the identity determination unit 15 performs such preferential determination using the document ID, identity among image data identification information can be determined based on the document ID.

Therefore, the feature amount extraction unit 14 does not necessarily extract the feature amount from image data identified by all image log information. As a result, it becomes possible to lighten the processing load in determining the identity.

The information replacement unit 16 performs replacement processing of unifying the document IDs of the image log information, which have been determined identical to each other. The case where the identity determination unit 15 uses the document IDs to determine that the second image log information and the fifth image log information are identical to each other, and the identity determination unit 15 determines based on the feature amounts that the feature amount of the image data identified by the image data identification information of image (1) contained in the first image log information and the feature amount of the image data identified by the image data identification information of image (6) contained in the sixth image log information are in the range of the identity and that the feature amount of the image data identified by the image data identification information of image (2) contained in the second image log information and the feature amount of the image data identified by the image data identification information of image (3) contained in the third image log information are in the range of the identity will be described as an example. In this case, the information replacement unit 16 performs unification replacement processing between the first image log information and the sixth image log information, and unification replacement processing among the second image log information, the third image log information, and the fifth image log information as shown in FIG. 5B. Specifically, the information replacement unit 16 performs unification replacement processing preferentially using document ID of 001 in the second image log information among the second image log information, the third image log information, and the fifth image log information and deletes the image data identification information of image (3) contained in the third image log information, the image data identification information of image (5) contained in the fifth image log information, and the image data identified by the image data identification information of images (3) and (5). The document IDs about the first image log information and the sixth image log information do not exist. Therefore, the information replacement unit 16 replaces the image data identification information of image (6) with the image data identification information of image (1), and deletes the image data identified by the image data identification information of the image (6).

Even if the image log information contains the code information, the identity determination unit 15 may determine identity based on the feature amounts in combination with the code information, because the code information is not necessarily put on all of the original images to be processed and can be incorrectly acquired due to the effect of dust deposition, etc.

Next, an example where the processing operation of the image processing apparatus 1 is connected to the server 3 through the network for use rather than on a standalone basis will be described.

If the image processing apparatus 1 is connected to the server 3 through the network for use, when the job execution unit 11 of the image processing apparatus 1 executes a processing job, the log generation unit 12 of either the image processing apparatus 1 or the server 3 may generate image log information and the log storage unit 13 of the server 3 may store the generated image log information and thereafter, at a predetermined timing, the identity determination unit 15 of the server 3 may determine identity among the image log information and the information replacement unit 16 of the server 3 may perform replacement processing. However, in such a use mode, the communication load between the image processing apparatus 1 and the server 3 may become large. This becomes noticeable particularly when a plurality of image processing apparatus 1 are connected to the server 3.

Thus, if the image processing apparatus 1 is connected to the server 3 through the network for use, it is desirable that the functions of the units 12 to 18 are placed delicately in the image processing apparatus 1 and the server 3. In the image processing apparatus 1, data amount of the image log information is reduced (duplicate storage of image is eliminated) through the identity determination made by the identity determination unit 15 and the replacement processing performed by the information replacement unit 16 as in the standalone mode described above. Then, image log information is transferred from the image processing apparatus 1 to the server 3 at a predetermined timing (which may be the same timing as or may be a different timing from the timing of determining identity). Then, the image log information is stored in batch in the server 3. According to this configuration, the image log information whose data amount has been reduced is transferred between the image processing apparatus 1 and the server 3 and thus the communication load therebetween can be suppressed efficiently.

After the image log information is transferred to the server 3, the identity determination unit 15 of the server 3 also determines identity among the image log information and the information replacement unit 16 of the server 3 also performs replacement processing at a predetermined timing (which may be the same timing as or may be a different timing from the timing of transferring the image log information). According to this configuration, when a plurality of image processing apparatuses 1 are connected to the server 3, duplicate storage of images between the image processing apparatus 1 can be eliminated, so that it becomes possible to furthermore reduce the data amount of the image log information.

Next, a processing operation after the image log information is stored will be discussed.

The log storage unit 13 included in the image processing apparatus 1 or the server 3 stores the image log information as described above. However, generally the available storage capacity of the log storage unit 13 is limited. Then, to effectively utilize the storage area, which is used by the log storage unit 13, the log deletion unit 17 deletes image log information stored in the log storage unit 13 from the log storage unit 13 under a predetermined condition such as a condition that a predetermined time period has been elapsed since the image log information is stored.

However, the image log information stored in the log storage unit 13 contains image log information after subjected to the replacement processing performed by the information replacement unit 16. That is, one image log information shares image data identification information with another image log information due to unification made in the replacement processing. Therefore, if the image log information is deleted from the log storage unit 13 based only on whether or not the predetermined condition is satisfied, the share relationship is lost, whereby the image data identification information is lost. As a result, some image log information may become invalid as image log information.

Thus, before the log deletion unit 17 deletes the image log information from the log storage unit 13, the replacement presence/absence determination unit 18 determines whether or not the image data identification information contained in the image log information to be deleted is post-unified information, which has been subjected to the replacement processing of the information replacement unit 16. The replacement presence/absence determination unit 18 may determine by checking if information stored in the log storage unit 13 contains the same information as the image data identification information to be deleted. However, any other known technique such as executing flag management as to execution of replacement processing by image data identification information may be used. Upon reception of the determination result of the replacement presence/absence determination unit 18, the log deletion unit 17 excludes the post-unified information subjected to the replacement processing from the deletion.

FIG. 6 is a schematic representation to show a specific example of processing of deleting the image log information.

The case will be discussed where image log information (first image log information) of a job concerning image data identification information of image (1), which was processed at date and time mm/mm/mm according to a command of user AAAA; image log information (second image log information) of a job concerning image data identification information of image (2), which was processed at date and time nn/nn/nn according to a command of user BBBB; image log information (third image log information) of a job concerning image data identification information of image (3), which was processed at date and time ll/ll/ll according to a command of user CCCC; and image log information (fourth image log information) of a job concerning image data identification information of image (4), which was processed at date and time kk/kk/kk according to a command of user DDDD are stored, for example, as shown in FIG. 6A. In this case, if the first image log information is to be deleted as a predetermined condition is satisfied, the replacement presence/absence determination unit 18 makes a determination as to the first image log information. As a result of the determination, it is found that the image data identification information contained in the first image log information is not shared with any other image data identification information because the first image log information has not been subjected to the replacement processing of the information replacement unit 16. Therefore, the log deletion unit 17 deletes the first image log information from the log storage unit 13.

On the other hand, it is assumed that the image data identification information of image (3) contained in the third image log information has been replaced with the image data identification information of image (1) and the image data identification information of image (4) contained in the fourth image log information has been replaced with the image data identification information of image (2) as shown in FIG. 6A. In this case, if the first image log information is to be deleted, the replacement presence/absence determination unit 18 determines that the first image log information has been subjected to the replacement processing and shares the image data identification information with the third image log information. Upon reception of the determination result, the log deletion unit 17 excludes the post-unified information (the first image log information) subjected to the replacement processing from the deletion.

When the log deletion unit 17 deletes the image log information from the storage means 13 after the determination made by the replacement presence/absence determination unit 18, even if image log information is deleted under a predetermined condition to effectively utilize the storage area used by the log storage unit 13, the share relationship of the image data identification information between pieces of the image log information is not lost. Therefore, it is possible to avoid impairing of the advantage of excluding duplicate storage of image, provided by unification as replacement processing is performed.

Next, the use mode of the image log information stored in the log storage unit 13 will be discussed with reference to specific examples.

Figure 8B:
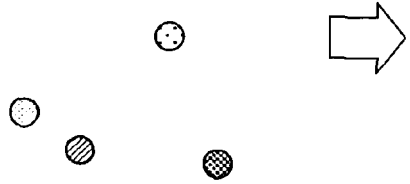

FIG. 7 is a schematic representation to show an outline of an example of the use mode of the image log information. FIG. 8 is a schematic representation to show an outline of another example of the use mode of the image log information.

It is possible to use the image log information stored in the log storage unit 13 for a follow-up survey on the processing job execution history. That is, the image log information enables the user to check who output the same image as a search target (e.g., information-leaked document) when and in what amount.

In the caser of realizing such use of the image log information, if the image data identification information, which are in the range of the identity, are shared by unification in replacement processing as described in the exemplary embodiment, it becomes possible to very enhance convenience of use of the image log information as described below: The case where the image log information stored in the log storage unit 13 is searched for image log information of an image meeting a condition of containing a character string of "for internal use only" will be described as an example. In this case, after the image log information stored in the log storage unit 13 is subjected to the replacement processing of the information replacement unit 16, the feature amount is extracted and pieces of image log information having the feature amounts in the range of the identity are unified by the replacement processing. Therefore, a search with using the feature amount of the image meeting the search condition as a key can be made very easily and rapidly. Specifically, it is very easy and rapid to create and output at least output history information containing the number-of-output-times information for each user for the image meeting the search condition, for example, as shown in FIG. 7. If such output history information is created and is output, the output history information is referenced for making it possible to check the processing job involving improper output (output a large number of times more than necessary, etc.,) and making it possible to take precautionary measures against information leakage and expect the suppression effect of information leakage.

After sharing the image data identification information in the range of the identity by unification in replacement processing, it can also be expected that the image search result using the image log information will be made appropriate. For example, as shown in FIG. 8A, in a feature amount space for image search in which unification is not performed by the replacement processing, its extraction results may vary even if the feature amount relates to the same document. Thus, to make a search with the feature amount of the document meeting the search condition as a key and output the top three close to the feature amount as the search results, the search results may become those about document A. In contrast, after unification by the replacement processing, those in the range of the identity are unified by the replacement processing for share and thus even if the top three close to the feature amount are output as the search results, the search results become those about documents A, B, and C and the search results leaning to one side can be avoided. Further, since the search targets are narrowed down naturally, it can also be expected that the time required for the search processing will be shortened. Therefore, it can be expected that the search accuracy will be made appropriate and consequently the reliability for the result of job execution history survey, etc., can be enhanced.

Although the exemplary embodiments of the invention have been described, it is to be understood that the invention is not limited thereto. Various modifications and changes may be made without departing from the spirit and the scope of the invention. For example, the image log information may be used in a different embodiment from the description of the embodiment. The format and the search method of the image log information, the specific technique for performing the replacement processing, and the like can also be replaced with those using any other known technology, of course.

What is claimed is:

1. An image processing apparatus comprising:
   a job execution unit that executes a processing job of image data;
   a log generation unit that generates image log information for identifying the processing job executed by the job execution unit and identifying the image data processed in the processing job;
   a log storage unit that stores the image log information generated by the log generation unit;
   a feature amount extraction unit that extracts a feature amount of the image data identified by the image log information;
   an identity determination unit that compares feature amounts, which are extracted by the feature amount extraction unit from plural pieces of the image data identified by plural pieces of the image log information, to determine identity among the plural pieces of image data; and
   a replacement unit that replaces information to identify a piece of the plural pieces of image data which are determined to be identical with each other, with information to identify another piece of the plural pieces of image data which are determined to be identical with each other,
   wherein the feature amount of the image data is obtained by using quantitative features of the image data when a size of the image data is normalized.

2. The apparatus according to claim 1, wherein:
   when code information, which identifies an original image, is embedded in the original image to be processed by the job execution unit, the log generation unit generates the image log information so that the generated image log information further comprises the code information, which is obtained from the original image when the job execution unit executes the processing job, and
   the identity determination unit determines the identity among the plural pieces of image data, based on the code information contained in the image log information.

3. The apparatus according to claim 1, wherein the replacement unit performs the replacement processing at a predetermined timing, which is different from a log generation timing at which the log generation unit generates the image log information.

4. The apparatus according to claim 1, further comprising:
   a log deletion unit that deletes the image log information from the log storage unit under a predetermined condition; and
   a replacement determination unit that determines whether or not each information, which identifies the corresponding image data and is contained in the corresponding image log information, has been replaced by the replacement unit, wherein:
   the log deletion unit deletes information, which identifies image data and is determined to have been replaced by the replacement determination unit.

5. The apparatus according to claim 1, wherein the image data is divided into meshes and a feature amount of each mesh is calculated.

6. An image processing system comprising:
   an image processing apparatus comprising:
   a job execution unit that executes a processing job of image data; and
   a server comprising:
   a log storage unit that stores image log information for identifying the processing job executed by the job execution unit and identifying the image data processed in the processing job, wherein:
   at least one of the image processing apparatus and the server comprises:
   a log generation unit that generates the image log information;
   a feature amount extraction unit that extracts a feature amount of the image data identified by the image log information;
   an identity determination unit that compares feature amounts, which are extracted by the feature amount extraction unit from plural pieces of the image data identified by plural pieces of the image log information, to determine identity among the plural pieces of image data; and
   a replacement unit that replaces information to identify a piece of the plural pieces of image data which are determined to be identical with each other, with information to identify another piece of the plural pieces of image data which are determined to be identical with each other,
   wherein the feature amount of the image data is obtained by using quantitative features of the image data when a size of the image data is normalized.

7. The image processing system according to claim 6, wherein the image data is divided into meshes and a feature amount of each mesh is calculated.

8. A non-transitory computer readable medium storing a program causing a computer to execute a process for managing image log information, the process comprising:
   generating the image log information for identifying an executed processing job and identifying image data processed in the processing job;
   storing the generated image log information;
   extracting a feature amount of the image data identified by the image log information;
   comparing feature amounts extracted from plural pieces of image data identified by plural pieces of image log information, to determine identity among the plural pieces of image data; and
   replacing information to identify a piece of the plural pieces of image data which are determined to be identical with each other, with information to identify another piece of the plural pieces of image data which are determined to be identical with each other,
   wherein the feature amount of the image data is obtained by using quantitative features of the image data when a size of the image data is normalized.

9. The non-transitory computer readable medium storing a program causing a computer to execute a process for managing image log information according to claim 8, wherein the image data is divided into meshes and a feature amount of each mesh is calculated.

10. An image processing method comprising:

executing a processing job of image data;

generating image log information for identifying the executed processing job and identifying the image data processed in the processing job;

storing the generated image log information;

extracting a feature amount of the image data identified by the image log information;

comparing feature amounts, which are extracted from plural pieces of image data identified by plural pieces of image log information, to determine identity among the plural pieces of the image data; and replacing information to identify a piece of the plural pieces of image data which are determined to be identical with each other, with information to identify another piece of the plural pieces of image data which are determined to be identical with each other, wherein the feature amount of the image data is obtained by using quantitative features of the image data when a size of the image data is normalized.

11. The image processing method according to claim 10, wherein the image data is divided into meshes and a feature amount of each mesh is calculated.

12. An image processing apparatus comprising:

an execution unit that executes a job, which processes image data;

a generation unit that generates log information comprising identification information for each job, each identification information identifying image data processed in the corresponding job;

a storage unit that stores the log information generated by the generation unit;

an extraction unit that extracts a plurality of feature amounts from the plural pieces of image data identified by the respective pieces of identification information;

a determination unit that compares the feature amounts of the image data extracted by the extraction unit to determine whether or not at least two of the plural pieces of log information are identical to each other; and a replacement unit, when the determination unit determines that at least two of the plural pieces of log information are identical to each other, the replacement unit replacing the at least two of the plural pieces of log information with any one of the at least two of the plural pieces of log information, wherein the feature amount of the image data is obtained by using quantitative features of the image data when a size of the image data is normalized.

13. The image processing apparatus according to claim 12, wherein the image data is divided into meshes and a feature amount of each mesh is calculated.

* * * * *